United States Patent
Adragna et al.

(10) Patent No.: US 8,604,643 B2
(45) Date of Patent: Dec. 10, 2013

(54) CONTROL DEVICE OF A PLURALITY OF SWITCHING CONVERTERS

(75) Inventors: Claudio Adragna, Monza (IT); Giuseppe Gattavari, Busto Arsizio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1345 days.

(21) Appl. No.: 12/336,185

(22) Filed: Dec. 16, 2008

(65) Prior Publication Data

US 2009/0152949 A1   Jun. 18, 2009

Related U.S. Application Data

(63) Continuation-in-part of application No. PCT/IT2006/000476, filed on Jun. 21, 2006.

(51) Int. Cl.
*H02J 1/00* (2006.01)

(52) U.S. Cl.
USPC .............................. 307/82; 307/53

(58) Field of Classification Search
USPC ................................. 307/52–63, 82
See application file for complete search history.

(56) References Cited

U.S. PATENT DOCUMENTS

| 6,166,934 A | 12/2000 | Kajouke et al. | |
| 6,654,264 B2 * | 11/2003 | Rose | 307/57 |
| 6,744,151 B2 * | 6/2004 | Jackson et al. | 307/52 |

FOREIGN PATENT DOCUMENTS

WO   03/041252 A1   5/2003

\* cited by examiner

*Primary Examiner* — Fritz M Fleming
(74) *Attorney, Agent, or Firm* — Seed IP Law Group PLLC

(57) ABSTRACT

A control device of a plurality of switching converters is disclosed; each converter comprises at least one power switch and is associated with a control circuit of the at least one power switch. The control device comprises means suitable for comparing a signal representative of the load of the plurality of converters with a plurality of reference signals and suitable for enabling or disabling at least one of said plurality of control circuits in response to said comparison.

22 Claims, 11 Drawing Sheets

CONTROL DEVICE OF A PLURALITY OF SWITCHING CONVERTERS

BACKGROUND

1. Technical Field

The present disclosure relates to a control device of a plurality of switching converters.

2. Description of the Related Art

In the prior art, multiple converters are known; they are made by means of a parallel combination of two or more switching converters in any of the standard types (for example, buck, flyback, boost, etc.), typically the same for all, in such a way that they share the same voltage source and dispense power on the same load. If then in such converters control methods are actuated, that fundamentally consist of staggering in an appropriate manner the PWM pulse trains that control each converter, it is more proper to speak of "multiphase" converters.

Multiple and multiphase approaches are used when with a single converter it is impossible or economically disadvantageous to comply with design specifications. The most common situation in which such approaches may be suitable is at a high level of power current. In fact, total power or current could equally be subdivided by a number n of converters, each one of which would be scaled to carry an N-th thereof. In addition to this, in the specific context of the multiphase approach, with an appropriate time control of the PWM pulse trains of the single converters it is possible to bestow on the totality thereof properties that are not detectable individually. For example, it is possible to minimize or even, in certain cases, to zero the ripple current at the input (or at the output) of the totality of converters, thereby optimizing stress and thus minimizing the bench cost of capacitors affected by optimization; or, still with a suitable control method, the overall system can be made equivalent to one that works at a frequency that is the same as the sum of the individual frequencies, thereby enabling the dimensions of the magnetic parts to be minimized and dynamic performances to be obtained that are inconceivable with a single converter.

FIG. 1 shows a two-phase buck converter used to supply the modern processors present in desktop and notebook PCs. This approach is characterized by very low supply voltages (less than 1.8V), by high consumption (greater than 90 A), and by very high consumption dynamics (greater than 1 A/ns). Below, specific reference will be made to multiphase converters; nevertheless, it is noted that all the remarks that will be made remain valid also in the simpler case of a multiple approach.

As already mentioned, a primary requirement that leads to the use of multiphase converters is the high power level. In this case, the maximum benefit from the use of a multiplicity of converters is derived when the system is called upon to work at full load, whereas with reduced loads to have many converters available leads to redundancy. Except for some cases in which redundancy is required in the supply system to ensure very high levels of service continuity, in general this constitutes a waste. Furthermore, at reduced loads, the loss of energy associated with the control (for example the driving of FET transistors), and a series of losses of energy regardless of the load (for example losses associated with loading and unloading stray capacitance of the power elements) begin to become significant and the conversion efficiency of the system (i.e., the ratio between the power returned to the load and the power absorbed by the input source) starts to deteriorate rapidly.

In many systems, which may have non-operational so-called standby conditions, in which there is an extremely reduced load for the converter that supplies them, conformity to voluntary standards or recommendations is requested that aim to regulate the reduction of the energy consumption of such appliances in the aforementioned conditions (e.g., EnergyStar, Energy2000, BlueAngel, etc.). In this case, the reduction of energy losses mentioned above becomes essential for achieving conformity.

If, sometimes, it is not an easy task to ensure that the consumption of a single converter falls within the recommended limits. It can be easily imagined how this task is further aggravated by the presence of several converters. There is thus the need to adapt known techniques for single converters to multiple or multiphase converters or to complement them with new ones specific to such converters in such a way as to facilitate the task of the system designer.

Various techniques are known for minimizing low or zero load consumption for single converters and all involve, substantially, the reduction of the operating frequency of the converter in the above conditions. In a multiphase converter composed of N single converters (namely an N-phase converter), any one of such techniques can be applied to each of the N converters of the totality. Thus if $Pin0$ is the input power absorbed by the single converter (for the sake of simplicity considered the same for all) in load conditions, for example zero, the power absorption in such conditions for the N-phase converter will be $N \cdot Pin0$. Although $Pin0$ is small, $N \cdot Pin0$ could exceed the limits envisaged for the power class to which the N-phase converter belongs if N is large enough.

BRIEF SUMMARY

In view of the disclosed prior designs, the present disclosure provides a control device for a plurality of converters that enables the consumption thereof to be reduced.

According to the present disclosure, a control device for a plurality of switching converters is provided, each converter having at least one power switch and being associated with a control circuit of the at least one power switch. The control device includes a circuit suitable for comparing a signal representative of the load of the plurality of converters with a plurality of reference signals and suitable for enabling or disabling at least one of the plurality of control circuits in response to the comparison.

In view of the present disclosure, it is possible to make a control device for a plurality of switching converters that enables medium to low load conversion efficiency to be optimized, thus reducing the natural rate of reduction of efficiency as the load decreases. Furthermore the said control device enables energy consumption to be minimized at zero load, thus reducing it to that of a single converter and maintaining the time relations between the switching periods of the single converters, thus maintaining the additional properties bestowed on the plurality of converters (e.g., minimizing current ripple).

In accordance with one embodiment of the present disclosure, a control device is provided for a plurality of switching converters, each converter having at least one power switch and being associated with a control circuit of the at least one power switch, the control device including a comparator circuit that compares a signal representative of the load of the plurality of converters with a plurality of reference signals and then enables or disables at least one of the plurality of control circuits in response to the comparison.

In accordance with another aspect of the foregoing embodiment, the device further includes a generating circuit that generates a plurality of signals staggered temporally by a given period of time, the plurality of signals received at the input of the plurality of control circuits.

In accordance with another aspect of the foregoing embodiment, the comparator circuit includes a plurality of comparators, each comparator having at the input the signal representative of the load of the plurality of converters and a reference signal of the plurality of reference signals.

In accordance with another aspect of the foregoing embodiment, each of the comparators are comparators with hysteresis that is suitable for disabling a control circuit if the representative signal of the load of the plurality of converters is less than the corresponding reference signal and to enable the control circuit if the signal representative of the load of the plurality of converters is the same as or greater than the total value given by the corresponding reference signal and the hysteresis.

In accordance with another embodiment of the present disclosure, a circuit is provided for controlling a plurality of switching converters having at least one power switch and associated with a control circuit, the circuit including a comparator circuit coupled to each control circuit and receiving a plurality of reference signals and a control signal representative of the load of the plurality of converters and outputting an enable/disable signal to each of the plurality of circuits in response to the comparison of the plurality of reference signals with the control signal.

In accordance with another aspect of the foregoing embodiment, the circuit includes further generating on a second output an adjustment signal that adjusts reception of the timing signals received by the plurality of control circuits from clock circuits outside of the circuit.

In accordance with another aspect of the foregoing embodiment, the comparator circuit includes a plurality of comparators, each comparator having at the input the control signal representative of the load of the plurality of converters and one of the plurality of reference signals.

In accordance with another aspect of the foregoing embodiment, the comparators include comparators having hysteresis, each of the comparators adapted to disable a control circuit when the control signal representative of the load of the plurality of converters is less than the corresponding reference signal and to enable to the control circuit when the control signal representative of the load of the plurality of converters is the same as or greater than a total value given by the corresponding reference signal and the hysteresis.

BRIEF DESCRIPTION OF THE SEVERAL VIEWS OF THE DRAWINGS

The characteristics and advantages of the present disclosure will be made more evident from the following detailed description of its embodiment thereof illustrated as non-limiting examples in the accompanying drawings, in which.

DETAILED DESCRIPTION

Figure 1:
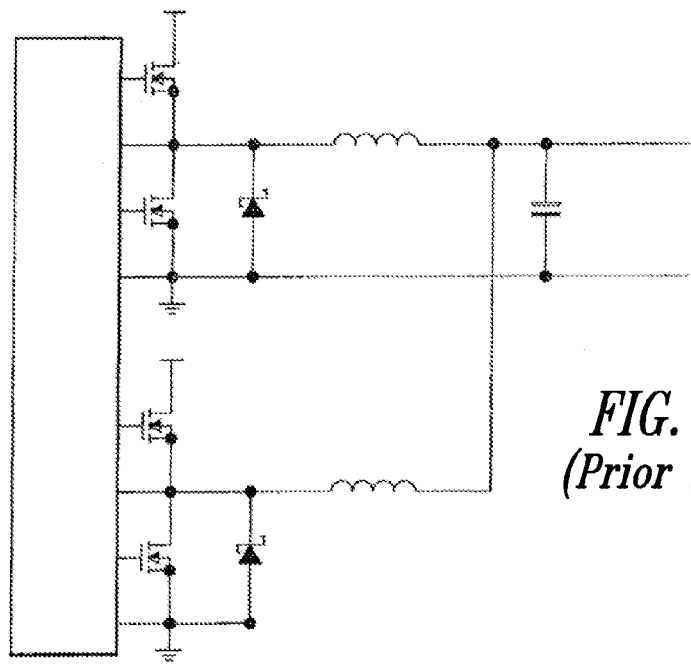
FIG. 1 shows a buck two-phase converter according to a prior design.
Figure 2:
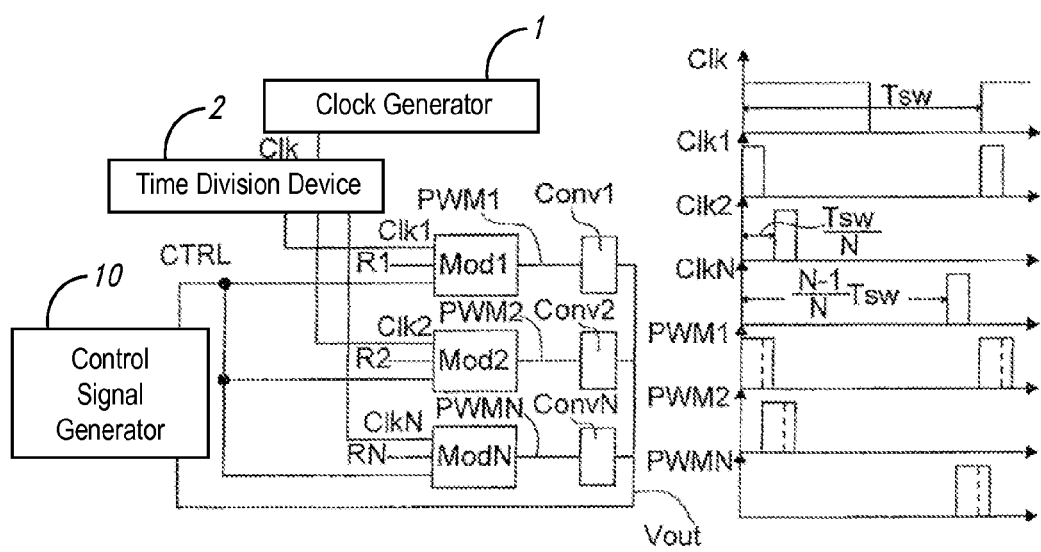
FIG. 2 shows a block diagram and a corresponding time diagram of a pulse-generating device for a multiphase converter.

With reference to the block diagram and to the corresponding time diagram shown in FIG. 2, the block diagram includes a block 1, a clock generator, and block 2, which is a time division device; said blocks 1, 2 can be made by means of any of the pulse generating devices for a multiphase converter system according to prior designs.

If it is a system of fixed-frequency converters, the clock generator block 1 is an oscillator that may be programmable by the user by means of the external passive components. If it is a system of hysteresis-controlled converters or self-oscillating converters, the block 1 will consist of the master-slave designation system between the different converters. In each case the block 1 generates a signal CLK of a period Tsw that represents the time base of the overall system.

The time division device, block 2, accepts the signal CLK in input and generates, on the N outputs thereof, signals Clkj, (j=1, 2, ... N) that are staggered in time by a period Tsw/N with respect to one another. If it is supposed that the signal Clk1 is synchronous with the signal CLK, each modulator Mod1 ... ModN will pilot by means of the signal PWM1 ... PWMN each converter Conv1 ... ConvN, more precisely the power switches of the single converter, in such a way that each single converter will operate at the frequency N/Tsw. In some practical embodiments the two blocks 1 and 2 considered may be physically indistinguishable from one another and the separation thereof into two functional blocks is conceptual.

The signal CTRL is an indicative signal of the load conditions of the plurality of converters Conv1 ... ConvN. The signal CTRL is generated by the negative feedback control loop that regulates the output voltage Vout of the plurality of converters Conv1 ... ConvN by means of a block 10 and is supplied to all the modulators Mod1 ... ModN. The structure therefore depends on the control method used for the single converters and on the type of modulation used. Depending on the control, substantially "voltage mode" and "current mode" modulators are used with the variants thereof. In the former case, the input signals Rj (j=1, . . . N) to the modulators are voltage ramps that are all the same as one another that are generated by the block 1 and are correlated in time with the signals Clkj. In the latter case the signals Rj are instant-to-instant voltage ramps that are proportionate to the current that flows in the power switch of the j-th converter.

As far as modulation is concerned, there are: (1) "trailing-edge" modulators in which the start of the conduction cycle of the power switch is set by the signal CLK (typically pulsed) and the end of the comparison between CTRL and Rj; (2) "leading-edge" modulators, where the signal CLK (typically pulsed) determines the end of the conduction cycle whereas the comparison between CTRL and Rj determines the start of the conduction cycle; and (3) "dual edge" modulators in which typically Clkj and Rj are identified in a triangular carrier and the comparison of the latter with CTRL determines both the start and the end of the conduction cycle.

Thus at the output of the aforementioned blocks modulated PWM signals are present that, through suitable interface circuits, will drive the power switches of the single converters.

As CTRL is common to all of them, the load of the plurality of converters Conv1 . . . ConvN is distributed evenly between the single converters. It can thus be said, in an equivalent manner, that the CTRL level depends on the load level carried by each single converter, which is approximately the same as 1/N of the total.

Figure 3:
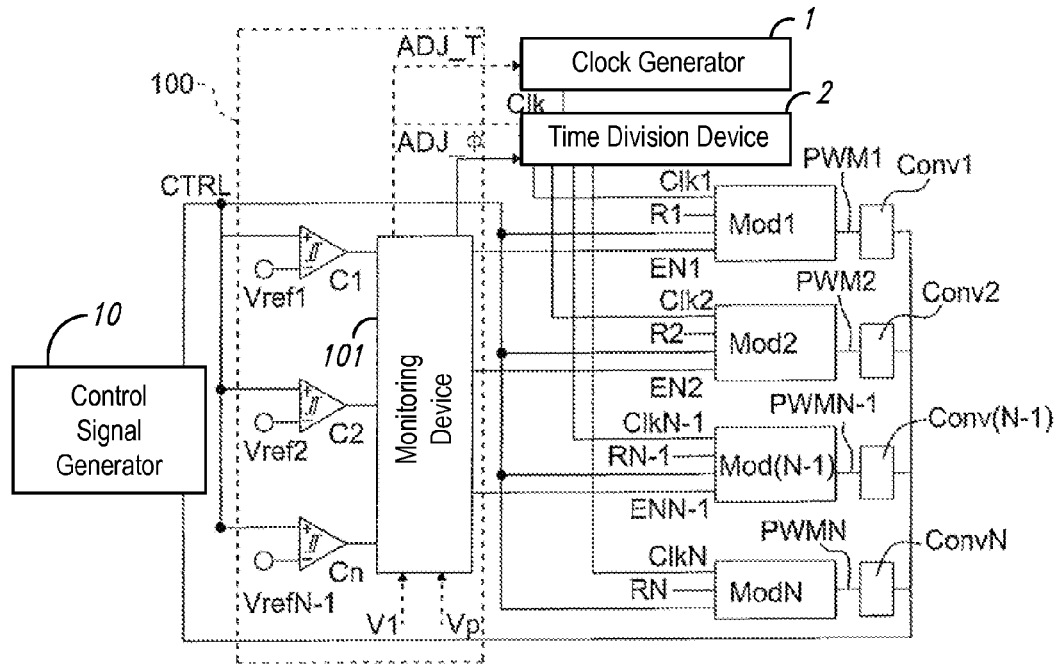
FIG. 3 is a block diagram of a control device according to a first embodiment of the present disclosure.

With reference to FIG. 3 there is shown a block diagram of the control device 100 according to the present disclosure. This device 100 is applicable in general to all types, whether they are non-insulated or insulated (i.e., types in which there is an insulating transformer), both with a direct current input and corrected sinusoidal voltage such as PFCs (Power Factor Correctors), special switching converters typically of boost type that absorb from the alternating power supply a sinusoidal current in phase with the voltage.

In addition, the control device also applies to those N-phase converters the single components of which through the nature thereof do not operate at a frequency fixed by a system oscillator but at a frequency depending on the operating conditions thereof, i.e., on input voltage and output current (for example, hysteresis-controlled converters and self-oscillating converters), and in which a slave system means that one of the converters ("master" converter) sets the switching frequency for all the others ("slave" converters).

In FIG. 3 there is shown a device 100 suitable for controlling the PWM modulators 1 . . . N associated with the power switches of the corresponding converters. The device 100 includes a set of comparators C1 . . . Cq, with $1 \leq q \leq N-1$ possibly with hysteresis, to an input of which the signal CTRL is applied that is indicative of the load conditions of the plurality of converters Conv1 . . . ConvN, and to the other inputs the reference voltages Vrefi (i=1 . . . q) are applied the values of which are monotonally not in ascending order from 1 to q. Preferably, it is assumed that the outputs of these comparators are at the high logic level if CTRL>Vrefi and at the low logic level otherwise. The device 100 includes the monitoring device 101 that receive at the input the outputs of the comparators C1 . . . Cq, and, optionally, additional control variables Vk (k=1, 2, . . . p). The device 101, on the basis of the logic status of all the inputs thereof, provides ENj signals (j=1, 2, . . . N−1) that are able to enable or disable the operation of N−1 of the N PWM modulators. When the j-th modulator is disabled, this means that the output thereof is such as to always keep the power switch off that is controlled by the latter. This means that the j-th converter is disabled. Furthermore, the device 101, on the basis of the number M of signals Enj at the low logic state and therefore the number of disabled modulators/converters, acts through the signal line ADJ_ϕ on the block 2 in such a way that the Clkj signals of the active outputs N-M are staggered in time by Tsw/(N−M). Optionally, in systems in which the current ripple of the single converter depends on the operating frequency thereof, the device 101 or alternatively the block 2 will act by means of the signals line ADJ_T on the block 1 in such a way that the period thereof is Tsw·(N−M)/N. Thus, every single converter will continue to operate at the same frequency and thus at the same current ripple level.

The N-phase converter arising from the plurality of converters Conv1 . . . Convn operates with all the active N phases for as long as the load is maintained above a certain level for which the CTRL signal is such that CTRL>Vref1 (with CTRL>Vrefq). If the load is such that CTRL<Vrefh (h=1, . . . q−1) (with CTRL<Vref(q−(h+1))) so that h of the n comparators Ci have outputs at the low logic state, M (M=0, . . . N−1) of the N converters, designated by the logic of the device 100 are switched off, and the staggering in time between the Clkj signals of the N−M active converters becomes Tsw/(N−M). Optionally, depending on the type of single converters and the operating mode thereof (assumed to be known a priori), the frequency of the CLK signal is increased in such a way that the switching period of the single converter is Tsw·(N−M)/N. It should be noted explicitly that in response to the switching off of one or more converters, as each of the remaining ones has to carry a greater quantity of power, the value of the signal CTRL increases, the reason for which the Ci comparators can be provided with an appropriately set hysteresis.

At the moment in which the load is such that CTRL<Vrefq (CTRL<Vref1) only the N-th converter will be active, and to the latter known techniques can be applied for the single converters to minimize low-load or zero consumption. If the load increases in such a way that CTRL>Vrefh (h=1, . . . q−1) (CTRL>Vref(q−(h+1))) (h=1, . . . q−1)) the Ms (M=1, . . . N−1) the switched-off converters are progressively enabled again until, returning to full load CTRL>Vref1 (CTRL>Vrefq), all Ns will be operative again.

Figure 4:
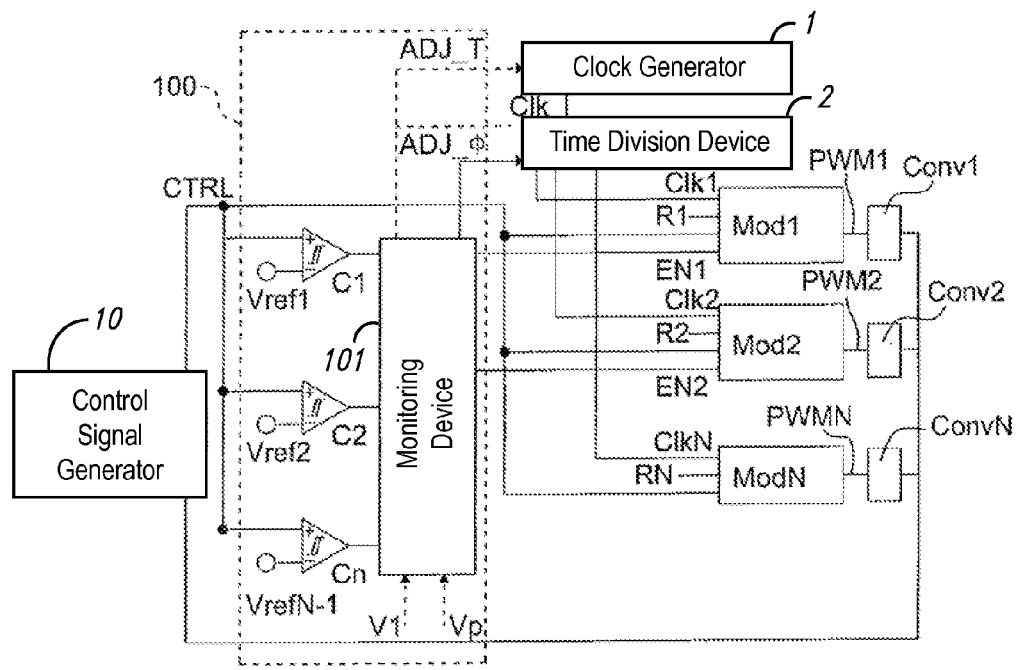
FIG. 4 is a block diagram of a control device according to a second embodiment of the present disclosure.

In FIG. 4 there is shown a control device according to a second embodiment of the present disclosure. The device is useful in the case of PWM modulators of "trailing edge" type, i.e., in which the conduction cycles of the power switch are initiated by the signals Clkj and terminated by the comparison between CTRL and Rj. This differs from the latter substantially through the lack of signals ENj (j=1, 2, . . . N−1) and through the fact that the disabling function of the PWM modulators and therefore of the associated converters is entrusted to the block 2. The latter in fact disables the j-th modulator simply by no longer sending the corresponding clock signal Clkj, so that the power switch commanded by it is not switched on.

Figure 5:
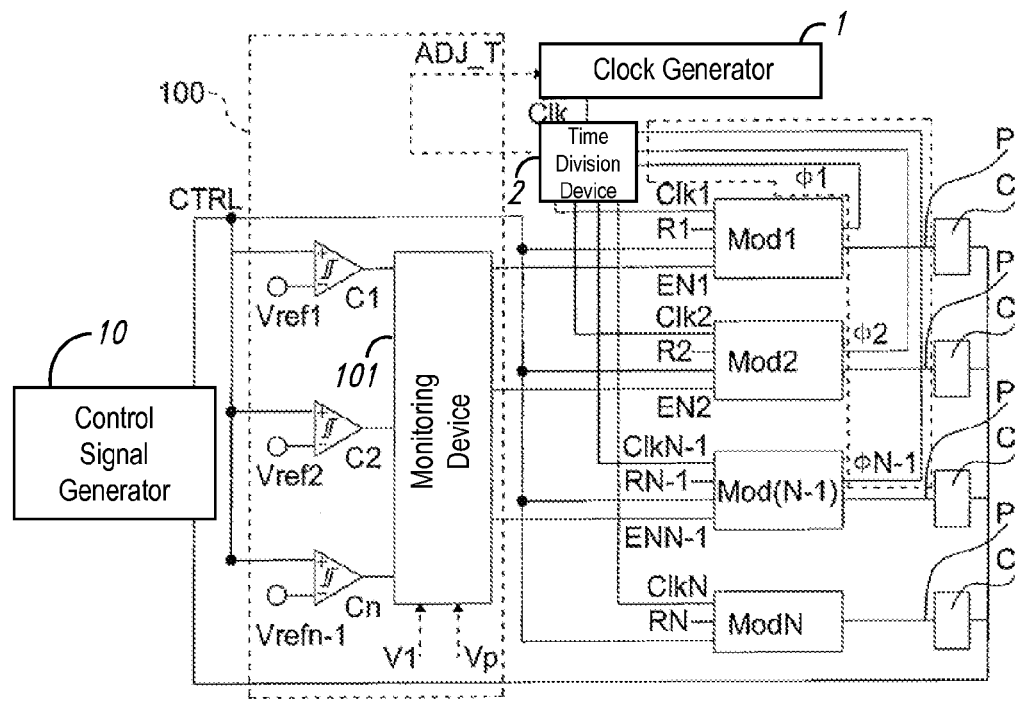
FIG. 5 is a block diagram of a control device according to a third embodiment of the present disclosure.

In FIG. 5 there is shown a control device according to a third embodiment of the present disclosure in which each PWM modulator communicates with the block 2 with a signal ϕ$_j$ (j=1, 2, . . . N−1) instead of the line ADJ_ϕ coming from the device 101. In this case any action on the block 1 is of necessity actuated through the block 2.

Figure 6:
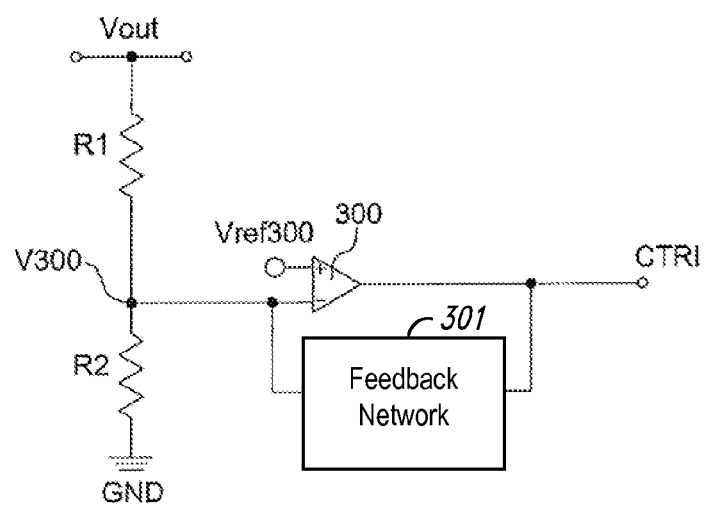
FIG. 6 shows a possible embodiment of the block 10 of the circuits in FIGS. 2-5.

In FIG. 6 there is shown a possible embodiment of the block 10 of FIGS. 2-5 in which the converters are not insulated. The block 10 includes a series of two resistances R1 and R2 arranged between the voltage Vout and ground GND, an error amplifier 300 having a non-inverting input terminal connected to a voltage supply Vref300 and the inverting input terminal connected to the voltage V300=R2*Vout/(R1+R2)

and a feedback network 301 arranged between the output and the inverting input terminal of the amplifier 300.

Figure 7A:
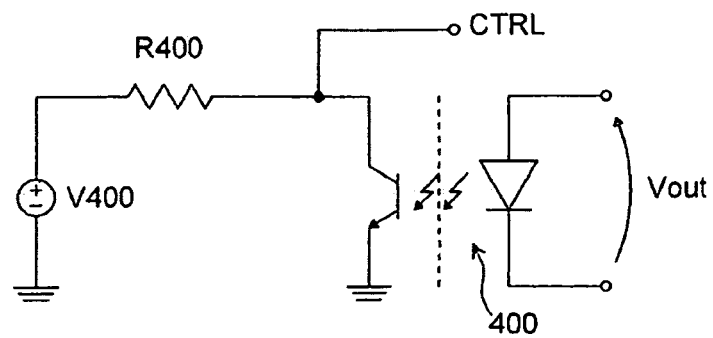
FIGS. 7a and 7b show other possible embodiments of the block 10 of the circuits in FIGS. 2-5.
Figure 7B:
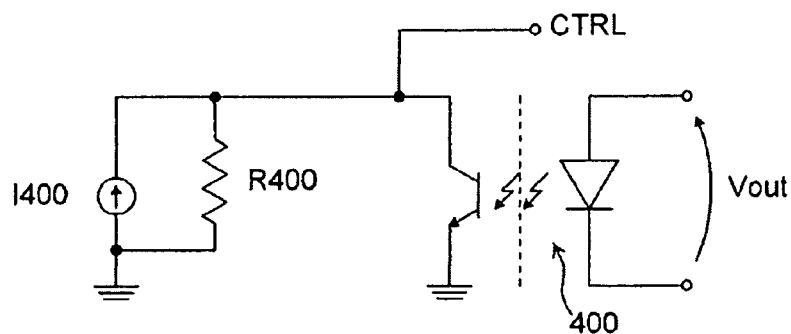

In FIGS. 7a and 7b there are shown possible embodiments of the block 10 of the FIGS. 2-5 in the case of insulated converters. The voltage Vout is an input on a side 401 of an optocoupler 400 and the other side of the optocoupler that is connected to a resistance R400 that is connected to a voltage generator V400 (FIG. 7a) or to a current generator 1400 connected in parallel to the resistance R400 (FIG. 7b).

Subsequently, there is disclosed a practical embodiment for the event that the N-phase converter is not redundant, i.e., that N−1 phases are not sufficient to carry the full load, or in other words, each converter is dimensioned to carry at most 1/N of total power. For the sake of the simplicity of exposition, let N=3, q=2, p=2 and the signal CTRL that is representative of the load conditions be exactly proportional to the load (CTRL=K·Pout) and, to fix the concepts, let the voltage thereof be in the range of 0 and 3V, inclusive.

Figure 8:
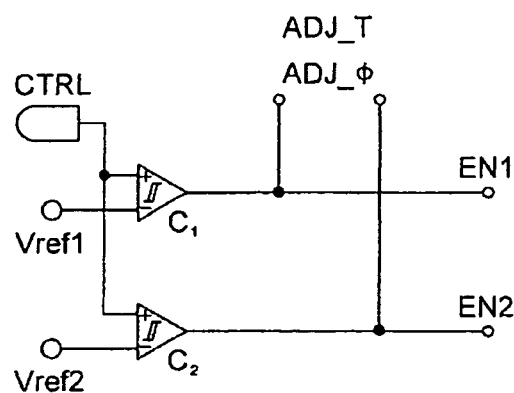
FIG. 8 shows a possible embodiment of the device 101 of the circuits in FIGS. 3-5.
Figure 9:
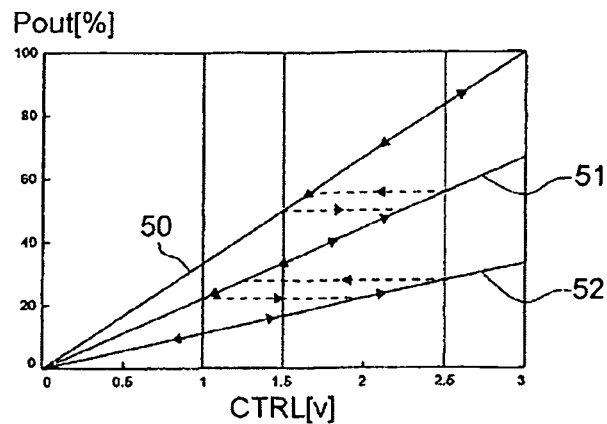
FIG. 9 shows diagrams of output power Pout as a function of the signal CTRL obtained with the circuit in FIG. 8.

With comparators with hysteresis, by suitably selecting hysteresis of the comparators, it is in principle possible to use the outputs of said comparators directly as signals EN1 and EN2, as shown in FIG. 8. The relationship between Pout and CTRL obtained with this circuit is illustrated in FIG. 9 and can be described as follows.

Let a start from maximum load condition (nominal power) be supposed, so all converters are switched on. The representative point of this condition is CTRL=3V, Pout=100%, and the outputs of both comparators are high, so EN1=EN2=1. By decreasing the load, the representative point will move along the line 50 to the point CTRL=Vref=1.5V, Pout=50%, where the output of the comparator C1 gets low and thus becomes EN1=0, and the converter Conv1 is switched off, leaving the converters Conv2 and Conv3 active. As a consequence of this, each converter which, before the triggering of the C1, carried 16.7% nominal power, will now have to carry 25% nominal power. The output voltage regulating system will move the value CTRL from 1.5V to 2.25V, it is necessary to take this power, as shown by the representative point that passes from line 50 to line 51 through a horizontal portion with constant power.

At the moment in which the output of C1 gets low it becomes Vref1=2.5V, so that the signal CTRL, although it increases, will not change the output of C1, which remains low. In order to get C1 to reswitch and to reactivate the converter Conv1, the CTRL signal has to exceed the threshold of 2.5V, i.e., the load, equal to 50% of nominal value, has to become greater than 55.6% of nominal value. By decreasing the load further, the representative point moves on the line 51 to the point CTRL=Vref2=1V, Pout=22.2%, where also the output of C2 gets low and therefore in addition to EN1=0, it also becomes EN2=0 and the converter Conv2 is switched off, leaving only the converter Conv3 active. As a consequence of this, the converter Conv3 that, before the triggering of the comparator C2, carried the value 11.1% of nominal power, has to now carry this load on its own. To do so the regulating system will take the CTRL value from 1V to 2V, as shown by the representative point that goes from line 51 to line 52 through a horizontal portion at constant power.

At the moment at which the output C2 goes low, it becomes Vref2=2.5V, so CTRL, although it increases, will not change the output C2, which remains low. In order to reswitch C2 and reactivate the converter Conv2, the CTRL signal has to exceed the 2.5V threshold, i.e., the load that is equal to 22.2% of the nominal value has to become 27.8% greater than the nominal value. By decreasing the load further, the representative point will move along the line 52. To the converter Conv3, at the moment in which the load falls below a suitable value, known techniques will be applied to minimize losses of power thereof, depending on type.

By increasing the load, the aforementioned lines 50-52 travel along in the opposite direction. As soon as the load reaches 27.8% of the total (CTRL=2.5V), the output C2 is high and EN2=1, and the converter Conv2 will be enabled again. The load for each converter being halved in this way, CTRL will decrease from 2.5V to approximately 1.25V, leaving C2 stably high (the threshold Vref2 is returned to 1V when C2 is triggered) and the representative point on line 51 is indicated. By increasing the load still further, the point will rise along the line 51 until, by becoming 55.6% greater than the nominal value (CTRL=2.5V), also the output C1 becomes high again, EN1=1 is obtained and also the converter Conv1 is enabled again. In this way, the load for each converter becomes 18.5% and becomes CTRL=1.67V, leaving C1 stably high (the threshold Vref1 is returned to 1.5V when C1 is triggered) and the representative point is returned to line 50.

With a suitable structure of blocks 1 and 2 the signals EN1 and EN2 can be used as lines ADJ_φ and, possibly, ADJ_T.

A suitable choice of hysteresis enables comparators to be used without hysteresis. However, in this case, the logic that controls the signals EN1 and EN2 cannot be simply a combination as in the preceding case because it is necessary to keep a record of how many and which converters are switched off to determine the action that the trigger of the comparators has to produce.

In our case, as two converters can be switched on or off, there will be two "status variables" EN1, EN2, which it shall be assumed are the outputs of two flip-flops FF1, FF2, of the edge-triggered set-reset type. Let S1 and S2 be the respective Set signals and R1, R2 the respective Reset signals. C1 and C2 indicate the logic outputs of the two homonymous comparators, referring respectively to the greater reference voltage Vref1 and to the lesser reference voltage Vref2. On the basis of this choice, it should be observed that if C1=1, of necessity C2=1, just as if EN1=1 then EN2=1.

By using a positive logic, the methodology that is the object of the present disclosure can be translated by the following Boolean expressions: R1=1 if C2=0 AND EN1=1, R2=1 if C2=0 AND EN1=0 AND EN2=1, S2=1 if C1=1 AND EN1=0 AND EN2=0, S1=1 if C1=1 AND EN1=0 AND EN2=1. Said logic is achieved by means of circuitry 120 in which a logic gate AND 121 has the signals C1 at the input, Q of the flip-flop FF2 and negated Q of the flip-flop FF1 and at the output the signal set S1 of FF1, a logic gate AND 122 having at the input signals C2 and Q of FF1 and at the output the signal reset R1 of FF1, a logic gate AND 123 having at the input the signals C1, negated Q of FF1 and negated Q of FF2 and at the output the signal set S2 of FF2, and a logic gate AND 124 having at the input the signals C2, negated Q of FF1 and Q of FF2 and providing at the output the reset signal R2 of FF2.

Figure 10:
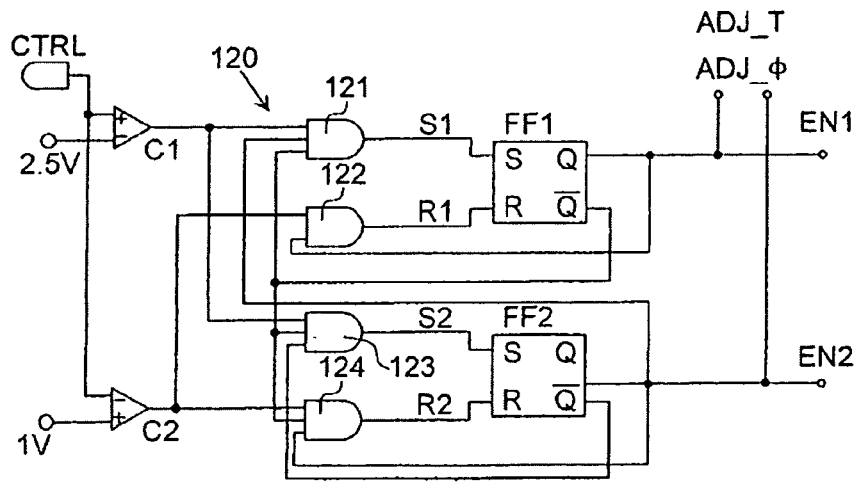
FIG. 10 shows another possible embodiment of the device 101 of the circuits in FIGS. 3-5.
Figure 11:
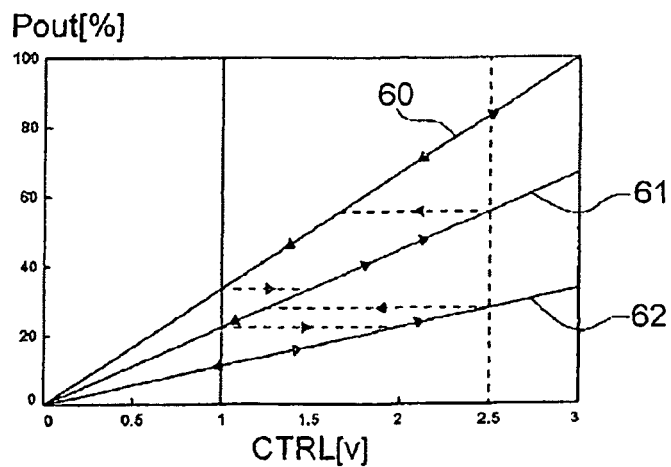
FIG. 11 shows diagrams of output power Pout in function of the signal CTRL obtained with the circuit in FIG. 10.

The circuit that achieves the aforementioned Boolean functions is illustrated in FIG. 10, (for the sake of simplicity, the inputs of C2 are exchanged in such a way as to save an inverter) whilst the relationship between Pout and CTRL obtained with this circuit is illustrated in FIG. 11 and can be disclosed as follows.

Let it be supposed that the starting point is maximum load condition (nominal power), so all converters are switched on. The representative point of this condition is CTRL=3V, Pout=100% and C1=1, C2=0 is obtained and EN1=EN2=1. By decreasing the load, the representative point will move along the line 60; when the load reaches 83.3% of nominal load it becomes C1=0 but this does not cause any variation to the flip-flop outputs, it inhibits only the set signals. By further diminishing the load to the point CTRL=Vref2=1V, Pout=33.3%, it becomes C2=1 so that with EN1=1 R1=1 and FF1 is reset, so that it becomes EN1=0 and the converter Conv1 is switched off, leaving the converters Conv2 and Conv3 active. Consequently, each converter that, before C2 was triggered, carried 11.1% of nominal power, now has to carry 16.7% of nominal power, so that the voltage output regulating system will shift the CTRL value from 1V to 1.5V, which is necessary to carry to said power, as shown by the representative point that moves from line 60 to line 61 through a constant-power horizontal portion. Again there is C2=0 but, to reactivate the converter 1, C1=1, i.e., the signal CTRL has to exceed the threshold by 2.5V, i.e., the load, currently at 33.3% of nominal value, has to become greater than 55.6% of nominal value.

By further decreasing the load, the representative point moves on the line 61, until, yet again, CTRL=Vref2=1V, but with Pout=22.2%. Again C2=1 will occur, as EN1=0 and EN2=1 becomes R2=1 and FF2 is reset in such a way that in addition to EN1=0, also EN2=0 and the converter Conv2 is switched off, leaving only the converter Conv3 active. In consequence thereof, the converter Conv3 that, before C2 was triggered carried 11.1% of nominal power, it will now have to carry this load alone, and to do this, the regulating system will take the CTRL value from 1V to 2V, as shown by the representative point that passes from line 61 to line 62 through a horizontal constant power portion. C2=0 is obtained again, but in order to reactivate the converter Conv2 it is necessary for C1=1, i.e., it is necessary for CTRL to exceed threshold of 2.5V, i.e., it is necessary for the load, currently equal to 22.2% of nominal value, to become 27.8% of nominal value.

By further decreasing the load, the representative point will move along the line 62. To the converter Conv3, at the moment at which the load falls below a suitable value, the known techniques will be applied for minimizing the power losses thereof, depending on type.

By increasing the load, aforementioned lines 60-62 are traveled along in the reverse directions. As soon as the load reaches 27.8% of the total (CTRL=2.5V), C1=1 occurs, so that as EN1=EN2=0 it becomes S2=1, FF2 is set, it becomes EN2=1 and the converter Conv2 will be enabled again. Consequently, by halving the load for each converter, CTRL will decrease from 2.5V to approximately 1.25V, and thus C1=0 still obtains. By still increasing the load, the point will rise along the blue line until, by becoming greater than 55.6% of the nominal value (CTRL=2.5V), yet again C1=1 is obtained, so that, as EN1=0, EN2=1 it becomes S1=1, FF1 is set, it becomes EN1=1 and the converter 1 will be enabled again. In this way the load for each converter becomes 18.5% and the CTRL becomes 1.67V and returns the representative point to the line 60.

Also in this case, with a suitable structure of the blocks 1 and 2 the same signals EN1 and EN2 can be used as lines ADJ_φ and, possibly, ADJ_T.

When one or more converters are switched on or switched off, the signal CTRL does not pass from the initial value to the new equilibrium value dictated by the regulation loop of output voltage according to grade variations, but through transistors that, in most cases are of the damped oscillating type. During these transition phases, therefore, CTRL has undershoots or overshoots with respect to what will be the new equilibrium value, the entity of which is often proportional to the amplitude of the transient, and it may thus exceed the amplitude of the hysteresis or thresholds of one or more comparators. This may cause two effects: first, a load variation that is of such an entity as not to trigger comparators and thus cause the converters to switch on/off (in the hypothesis of considering only the initial and final initial and final CTRL signal values), which may temporarily take the signal CTRL below or above one of the thresholds and cause an undesired switch-on or switch-off; secondly, following a load variation of an entity such as to cause one or more comparators to trigger, exceeding overshoot/undershoot the hysteresis or the thresholds of the comparators, the latter will switch back to the preceding status. The aforementioned phenomena may lead to system instability, inasmuch as the comparators continue to switch between one state and the other, causing continuous switching on and off of the individual converters, which is obviously undesirable or hazardous.

In order to eliminate or minimize the possibility of triggering this instability, in the practical embodiment of the circuit, starting from the circuits shown in FIGS. 8 and 10, alternatively or conjunctly it is necessary to add the additional logic that is able to reject the aforementioned overshoot/undershoots and ensure that said undershoot/overshoots are minimized or eliminated completely.

For the circuit in FIG. 8 logic signals have to be generated that are able to mask temporary CTRL signal swings beyond certain thresholds. This is the equivalent of introducing delays. With regard to this, it should be noted that even a long delay is tolerable before switching off a converter (efficiency is a question of regular operation) but at switch-on it has to be rather short. Following a sudden load increase beyond what the active number of converters can bear, an excessive delay at switch-on could cause a temporary loss of regulation of the output voltage.

Figure 12:
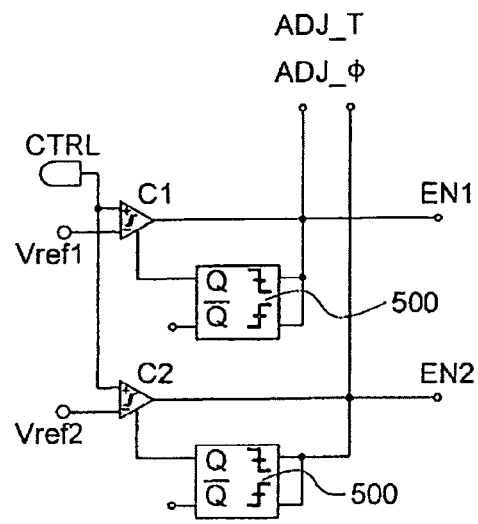
FIG. 12 shows a version of the embodiment of the circuit in FIG. 8.

A practical example of an embodiment based on the circuit in FIG. 8 that, by maintaining the functionality thereof illustrated in FIG. 9, prevents the transient oscillations of the CTRL signal shown in FIG. 12. In this circuit, after each switching, each of the comparators is deactivated for a time Tmask fixed by a monostable multivibrator 500 that is sensitive to both edges of the input thereof in such a way as to freeze the state thereof. The time Tmask, obviously, has to be sufficiently long to mask the undershoots or overshoots of the signal CTRL but not so long as to delay possible restarts following rapid and frequent variations in loads that are such as to temporarily lose regulation of output voltage.

Figure 13:
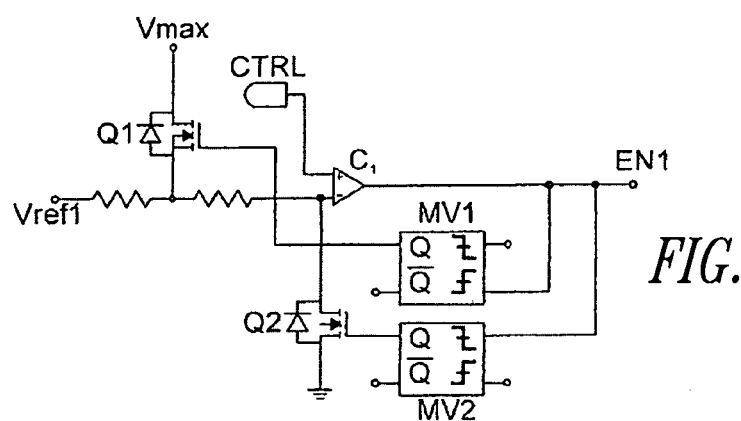
FIG. 13 shows a version of the embodiment of the circuit in FIG. 10.

Another example of an embodiment based on the circuit in FIG. 8 is shown in FIG. 13 (only for the comparator C1; on comparator C2 the same circuit would have to be replicated). Therein, the hysteresis of the comparator, after each switching, is increased for a time Tmask in such a way that the undershoot or overshoots of the signal CTRL do not make it reswitch. This is possible by means of two monostable multivibrators Mv1 and Mv2, the first with an input that is sensitive to negative edges and the other with an input that is sensitive to the positive edges. When C1 goes low to switch off the converter Conv1, after switch-off the signal CTRL will suddenly increase with a probable overshoot, so that the threshold of C1 is temporarily moved to the value Vmax (for example by 5 V) by the switch-on of the pull-up Q1 controlled by the monostable Mv1. If on the other hand C1 goes up to again switch on the converter Conv1, after voltage is switched on again the signal CTRL will suddenly decrease with a probable undershoot, so that the threshold of C1 is temporarily taken to zero by the switch-on of the pull-down Q2 controlled by the monostable Mv2.

Also in this case the time Tmask has to be sufficiently long to mask the undershoots or overshoots of the signal CTRL but not too much as to delay possible new switch-ons following rapid and frequent variation of the loads such as to temporarily lose the regulation of the output voltage.

Figure 14:
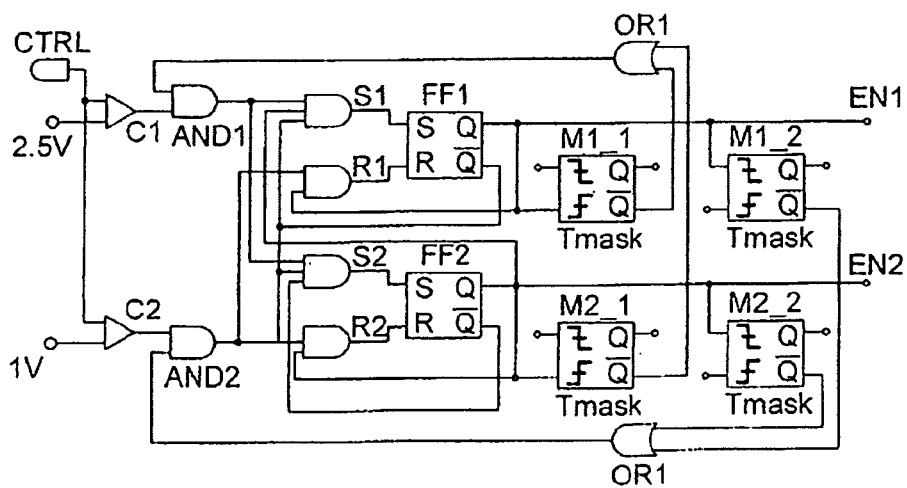
FIG. 14 shows another version of the circuit in FIG. 8.

The same concepts used to immunize the circuit in FIG. 8 can be used for the circuit in FIG. 10. In FIG. 14 there is shown an example that, in some way, combines both techniques. Two monostable multivibrators for each line (M1_1 and M1_2 for EN1 and M2_1 and M2_2 for EN2) are sensitive two-by-two to the negative edges (M1_1 and M2_1) and to the positive edges (M1_2 and M2_2). With the same methods disclosed with regard to the circuit in FIG. 13, the outputs of the comparators C1 and C2 are masked for a time Tmask after a switch-off of a converter and after a switch-on respectively.

The fundamental limitation to the approach considered so far lies in the compromise on the duration of time Tmask, to be set during design of the integrated control device so as to cover the greatest number of possible application situations without, however, having the certainty that with loads having wide and frequent variations there are no malfunctions due to the fact that the monitoring system is in practice inhibited for a certain time after each intervention.

The complete minimization or elimination of the CTRL signal undershoots and overshoots during transitions can be performed by means of sequencing of the progressive switch-on and off.

Figure 15A:
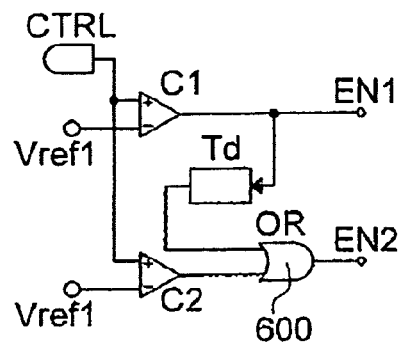
FIGS. 15a and 15b show other embodiments of the circuits in FIGS. 8 and 10.
Figure 15B:
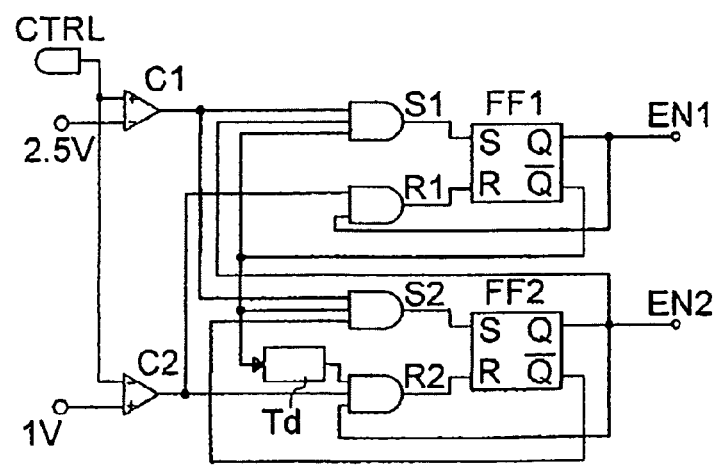

On the basis of the former criterion, following a load decrease that is such that more than a converter has to be switched off, said converters are switched off one by one, inserting a delay between a switch-off and another. In this way, the total transient is divided into several transients of lesser amplitude, so that also the overshoots and undershoots have less amplitude. In FIGS. 15a and 15b there is shown, by way of example, how this can be achieved in the circuits of FIG. 8 and FIG. 10.

With respect to the circuit in FIG. 8, a logic gate OR has been added and a delay cell Td (FIG. 15a); the delay cell Td has in input the signal E1 and supplies an output signal that is in input to a logic gate OR 600 with the signal C2. The signal EN2 will get low when the C2 output is low, provided that EN1 has been low for at least a time that is the equivalent of Td. With respect to the circuit in FIG. 10, a delay cell Td has been added (FIG. 15b) having at the input the negated output Q of the FF flip-flop 1 and being suitable for supply the output signal to the logic gate AND that supplies the signal R2.

The progressive switch-off criterion does not involve the device 100 as considered so far but intervenes on the Modulators PWM. The basic idea is not to suddenly switch off the j-th converter when the signal ENj gets low but to reduce progressively the power carried by the latter from the value that determined the transition to zero of ENj, so as to make gradual the consequent increase of CTRL and to minimize, if not to eliminate completely, the consequent overshoots. A certain gradualness in restarts, in practice the restart known as soft-start, but very brief to prevent the regulation of output voltage from being lost, will contribute to reducing the consequent undershoots.

As the actual switch-off of the j-th converter is delayed with respect to the transition to zero of ENj, the action of adapting the block 2 to the new number of active converters can no longer be performed directly by the device 100 as in the preceding cases but will be performed by the j-th modulator that, by means of the line φj, communicates complete switch-off. The system in which this operating method is used is the one illustrated in FIG. 5.

Figure 16:
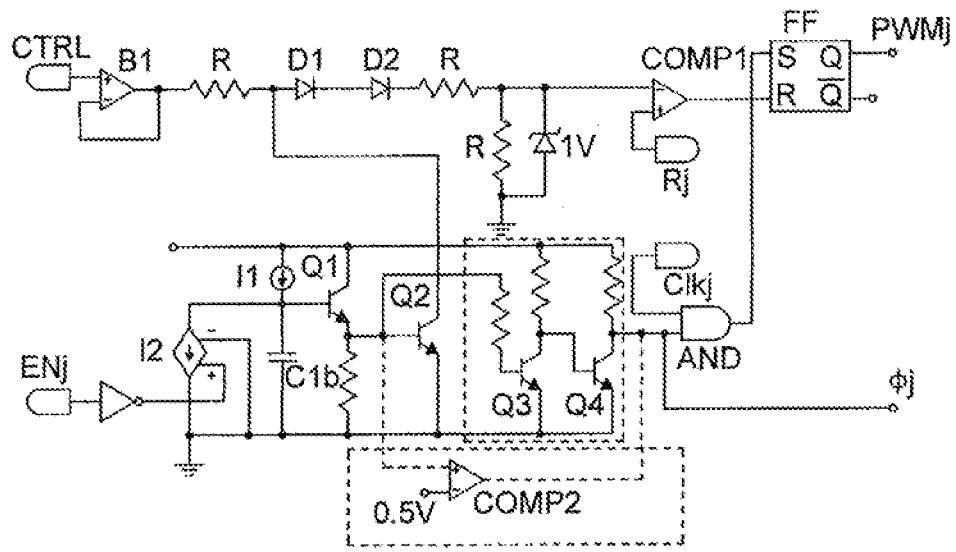
FIG. 16 shows an embodiment of the soft-stop function for a PWM modulator.

To provide an example of an embodiment of said function that will be called soft-stop for short, it is appropriate to refer to a preset structure of a PWM modulator and will choose the structure of the PWM controller that is most widely used commercially, the UC3842. In FIG. 16 the soft-stop circuit is shown, which is identified by the square dotted together with the PWM modulator of UC3842.

The fluctuation constituted by the transistors Q1, Q2 clamps the voltage on the emitter terminal of Q2 at a voltage equal to that present on the capacity C16, short-circuiting to the ground the current that the circuit connected to the Q2 can dispense. In order to limit this current, the resistance 2R of the divider R-2R has been doubled that is typical of the modulator of the UC3842 in R+R and the first resistance R has been placed at the output of the non-inverting buffer B1, used not to alter the signal level of CTRL that is also supplied to the other modulators.

If ENj is high, the generator 12 is switched off, the capacity C is kept loaded by the generator I1 at a voltage near Vbus (Vbus−Vbe, according to a typical embodiment of the generator I1), so the transistor Q1 is conducting, the emitter of the transistor Q2 clamps Vbus−Vbe. Having selected Vbus in a suitable manner, in these conditions, the voltage on the emitter of Q2 is less than Vbus−Vbe for all the values the signal CTRL can assume, so Q2 is disallowed and the voltage $V_{CSref}$ at the inverting input of the comparator PWM COMP1 is linked to the value of the signal CTRL in this manner: $V_{CSref}=$ (CTRL−2*Vbe)/3 if CTRL≤3V+2Vbe and $V_{CSref}=1$ if CTRL≥3V+2Vbe.

In these conditions, the transistor Q3 is saturated and the transistor Q4 is disallowed, so that to the gate AND a high logic input is applied and thus the clock pulses Clkj coming from the block 1 pass and go to set the PWM latch FF, causing the switch-on of the power switch of the j-th converter. The end of conduction occurs at the moment at which the signal Rj becomes the same as the level $V_{CSref}$. In fact, the output of the comparator COMP1 becomes high and resets the PWM latch FF. In the specific case, the signal Rj is a voltage that is proportional to the current that traverses the power switch of the j-th converter, so the level $V_{CSref}$ defines the current that traverses the power switch at the end of the conduction, and thus the power carried by the converter.

If the comparator COMP1 were present instead of the block Q3+Q4 with the corresponding polarization resistances, the output of the comparator would be high, and exactly the same normal operating situation would be obtained.

If ENj is driven low because the voltage CTRL has become less than the reference level that marks switch-off of the j-th converter, the generator 12 is switched on and C16 is discharged with the current I2-I1. This difference is deliberately small in such a way as to discharge C16 in the course of some milliseconds. Thus, the voltage on the Q2 base decreases the reserve thereof (maintaining a Vbe below), and as soon as there is a Vbe below the voltage on the emitter the transistor Q2 starts conduction and forces voltage on the following emitter to follow within a few millivolts the voltage that is on the C16. Consequently, the level $V_{CSref}$ is not correlated to the signal CTRL and progressively decreases with the same dV/dt as the voltage on C16, thus progressively diminishing the power carried by the converter. At the moment at which C becomes the same as 2·Vbe, $V_{CSref}$ is cancelled by the effect of the diodes D1 and D2 and therefore ideally the output of COMP1 should be high and the flip-flop set-reset FF should always remain reset, thereby switching off the converter. Through the effect of the voltage offset of the comparator COMP1, however, the output of the latter might not always be high and the clock pulses Clkj could still set the flip-flop FF and provide very short pulses at the output of the latter. In order to prevent this, as soon as the voltage on the capacitor C16 falls below 2·Vbe and the voltage on the transistor bases Q2 and Q3 becomes less than Vbe, Q3 is disallowed, Q4 switches on, and at the input of the gate AND there is a low signal that blocks the pulses Clkj. This is also the signal φj that reduces and acts on the block 2. The discharge of C16 continues until there is typically a voltage Vbe thereupon. So also Q1 is at the disallowed limit (also because on the emitter thereof there is a small positive voltage that is due to the base current of Q2).

If instead of the block Q3+Q4 with the corresponding polarization resistances there were the comparator COMP1, the output of the latter would be low as soon as the voltage on C16 becomes less than Vbe+0.5V. Therefore, the voltage on the base of Q2 becomes less than 0.5V, and exactly the same situation would be obtained.

If RNj now had to become high again because the load has increased, the generator I2 would be switched off and the capacitor C16 would be loaded starting from approximately Vbe with the current I1, which is considerably greater than I2-I1 so the voltage on C16 increases much more rapidly than it does in reduction. As soon as the voltage on C16 reaches 2·Vbe, Q3 starts conduction and Q4 is disallowed, so that the pulses Clkj can still set the flip-flop FF. Furthermore, the voltage $V_{CSref}$ becomes greater than zero and the converter in fact restarts and becomes able to provide a power value at the moment at which the voltage on C16 becomes such as to disallow Q2.

Figure 17:
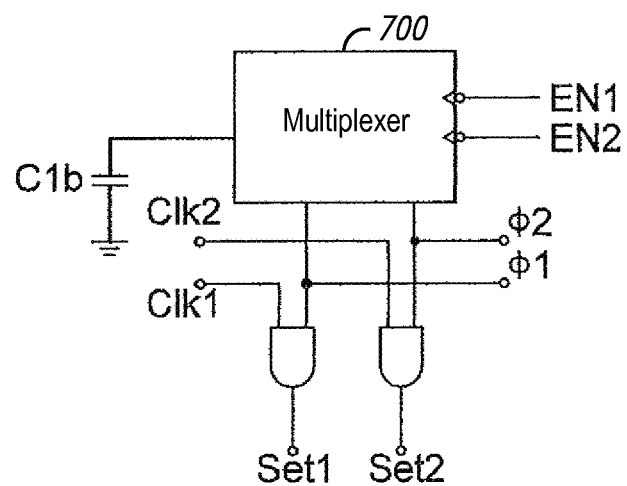
FIG. 17 shows a version of the soft-stop function for PWM modulators.

In the considered example, the capacitor C16 is inside the control device and is affected by the value limitations of the integrated capacities. If switch-off times were required that are such as to make necessary capacitances of a non-integrable value, C16 should be external. In an N-phase controller, N−1 capacity and N−1 pin dedicated to this function would be required. It is more advantageous to use a sole timing capacity in common between all the converters and a logic that controls an analogue multiplexer 700 that runs the timer on the converter during the switch-off phase, as shown in FIG. 17.

Figure 18:
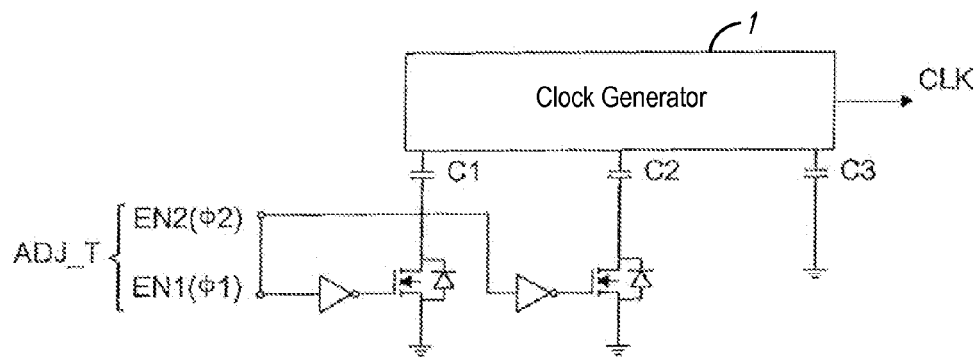
FIG. 18 shows an embodiment of the block 1 of the circuits in FIGS. 3-5.
Figure 19:
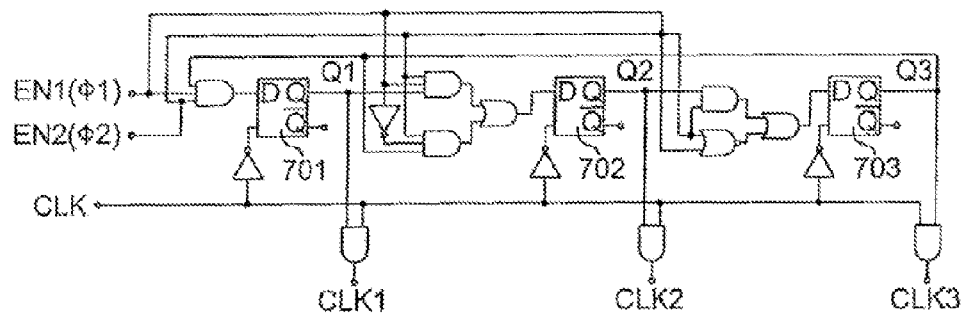
FIG. 19 shows an embodiment of the block 2 of the circuits in FIGS. 3-5.

For the sake of a complete exposition, in FIGS. 18 and 19 there are shown respectively an example of an embodiment of the block 1 with adjustable frequency and an example of an embodiment of the block 2.

In FIG. 18 there is shown an oscillating block, the internal structure of which may be of any prior type, in which the timing elements (in the example, the capacitors $C_1$, $C_2$ and $C_3$ which are assumed to be the same as one another) can be disconnected by means of the controlled switches in such a way as to modify the oscillation frequency thereof. In the example under consideration, when a sole converter is operational, all the capacitors are connected and the oscillation frequency is $f_{osc}$. If the functioning converters are two, $C_1$ is disconnected by the corresponding switch and the oscillation frequency becomes $2 \cdot f_{osc}$. When all the converters are operational $C_1$ and $C_2$ are disconnected by the corresponding switches and the oscillation frequency becomes $3 \cdot f_{osc}$.

In FIG. 19 there is shown a loop counter having three flip-flops of type D 701-703 in which states $Q_1$, $Q_2$, $Q_3$ mask the clock signal CLK generated by the circuit in FIG. 18. Of these outputs, only one is at logic level one and the position thereof slides forwards by a place at the trailing edge of each clock pulse.

The loop (i.e., the output Q of the third flip-flop) is closed on the input D of the former when all the converters are active, i.e., EN1 (φ1) and EN2 (φ2) are both at logic level one, in such a way as to count for three and thus distribute the pulses CLK in sequence to the various outputs Clk1, Clk2, Clk3. It should be remembered that in these conditions the oscillator is operating at a frequency $3 \cdot f_{osc}$, so each converter operates at the frequency $f_{osc}$. The loop is on the other hand closed on the input D of the second flip-flop when EN1 (φ1) is at the logic level zero and EN2 (φ2) at the logic level one, whilst the input D of the first flip-flop is forced to zero, so as to count for two and thus distribute the pulses CLK in sequence to the sole outputs Clk2 and Clk3 and disable Clk1. In these conditions the oscillator is operating at a frequency $2 \cdot f_{osc}$, so each converter also operates at the frequency $f_{osc}$. When only the converter Conv3 is operational, the inputs D of the first two flip-flops are forced to zero and that of the third flip-flop is forced to one in such a way that also the output thereof is one and that accordingly Clk$_3$=CLK, which in these conditions is a frequency signal $f_{osc}$.

Figure 20:
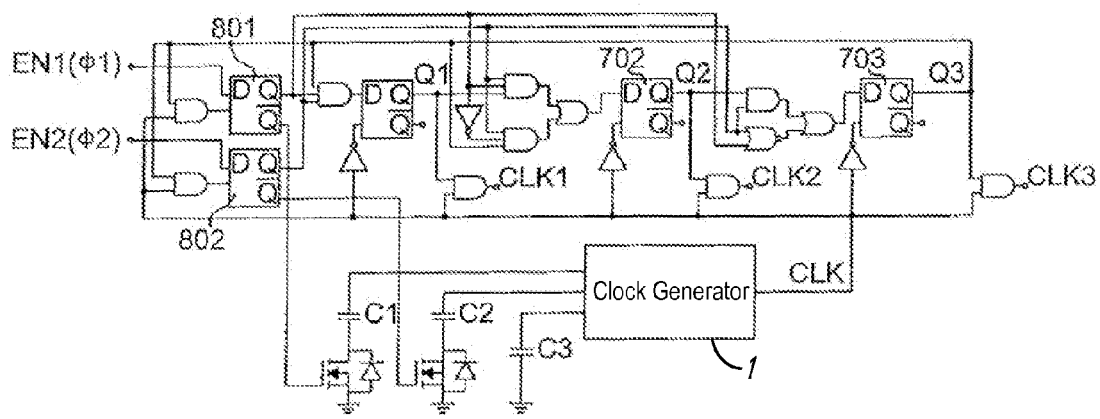
FIG. 20 shows another embodiment of the blocks 1 and 2 of the circuits in FIGS. 3-5.
Figure 21:
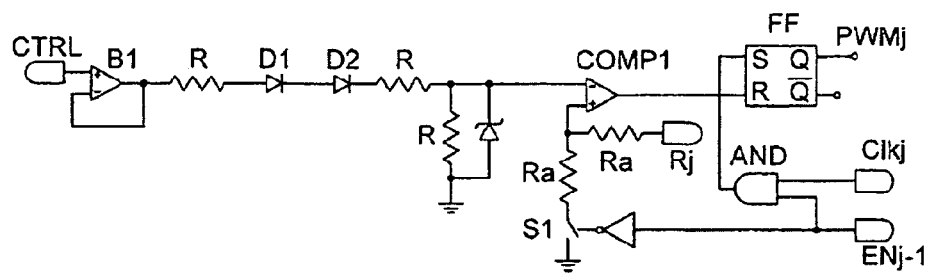
FIGS. 21-23 show possible embodiments of the modulators of the circuit in FIG. 3.

Lastly, it should be noted that signals ENj (φj) are asynchronous with respect to CLK and therefore, to ensure an always coherent transition between a condition and the other of enabling/disabling of the converters and variation to oscillator frequency, it may be advantageous for said signals to be able to cause variation to the closing of the counter loop and timing of the oscillator only upon completion of a count cycle, i.e., only when the output $Q_3$ of the third flip-flop is high. There will therefore be delays to switch-off and switch-on that at the most may amount to two clock cycles and which are thus negligible. A system composed of the blocks 1 and 2 that operate according to the previous description is illustrated in FIG. 20.

In this, the signals EN1 (φ1) and EN2 (φ2) are transmitted to the given inputs of two other flip-flops of type D 801-802, called synchronization flip-flops, that make the datum visible at the output only at the pulse CLK that means that $Q_3$ goes to logic state one. If $Q_3$ is always in logic state one because only the converter Conv3 is operational, the clock pulse will provide the edge that activates the synchronization flip-flops.

A further possibility for switching off converters consists of modifying the circuitry of the modulators by changing the gain thereof, as visible in FIGS. 21-23 and 24-26 that correspond to the respective circuit diagrams of FIGS. 3 and 5. The modulators of said circuits include a part of the modulator in FIG. 16 without the soft-stop function and differ from one another through the increase in the signal in input at the inverting terminal of the comparator COMP1 (FIGS. 21 and 24) or the decrease of the signal in input at the non-inverting terminal of the comparator COMP1 (FIGS. 22, 23, 25 and 26).

In the former case (FIGS. 21 and 24) a level (N−M)/N of the signal Rj is carried with a circuitry comprising a resistance Ra connected to the signal Rj and to the inverted terminal of the comparator COMP1, another resistance Ra connected to the non-inverting terminal of the comparator COMP1, and to a switch S1 connected to ground and piloted by the negated signal Enj-1. The circuitry includes a buffer B1 having the signal CTRL at the input and having the output connected to a series of a resistance R, two diodes D1 and D2, another resistance R connected to a terminal of a parallel circuit of another resistance R and a 1V Zener diode and connected to the non-inverting terminal of the comparator COMP1. The output of the comparator COMP1 is the reset signal R of a set reset flip-flop FF, the set signal S of which is in FIG. 21 the output of a login gate AND having at the input the signal Enj-1 and Clkj whilst in FIG. 24 it is the signal Clkj. The output signal Q of the flip-flop FF is the signal PWMj.

In the second case (FIGS. 22, 23, 25 and 26) a circuitry is added with switches and resistances placed parallel or serially with respect to the two diodes D1 and D2. The switches are controlled by the signals Enj-1 in such a way as to short-circuit a greater number of resistances as the number of converters that are switched off increases.

Figure 22:
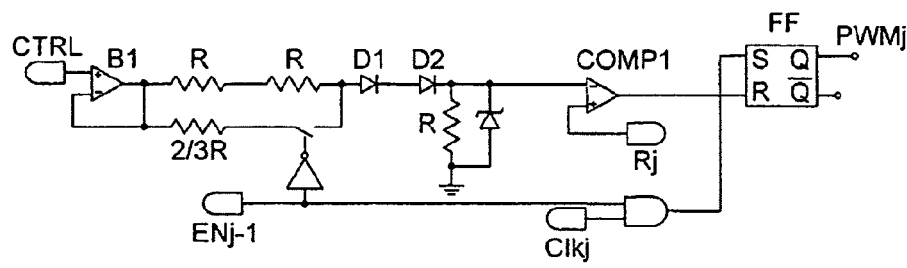
Figure 25:
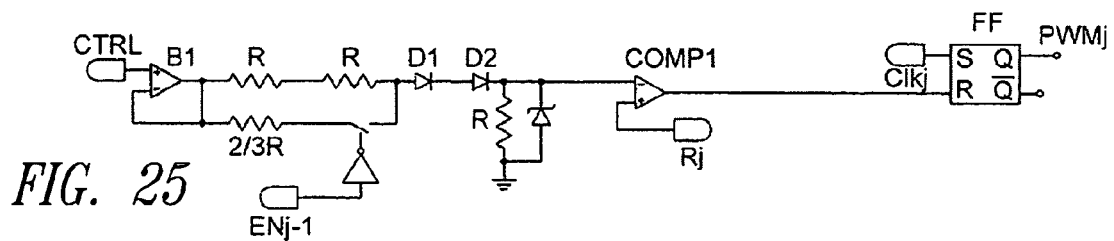

In FIGS. 22 and 25 a resistance having the value ⅔ of R and a switch S1 are placed parallel to the series of two resistances R. The switch S1 is driven by the negated signal Enj-1. The sole difference between the circuits in FIGS. 22 and 25 is that the signal S of the flip-flop FF is the signal at the output of a gate AND, which has at the input the signals Enj-1 and Clkj in the circuit in FIG. 22 whilst it is only the signal Clkj in the circuit in FIG. 25.

Figure 23:
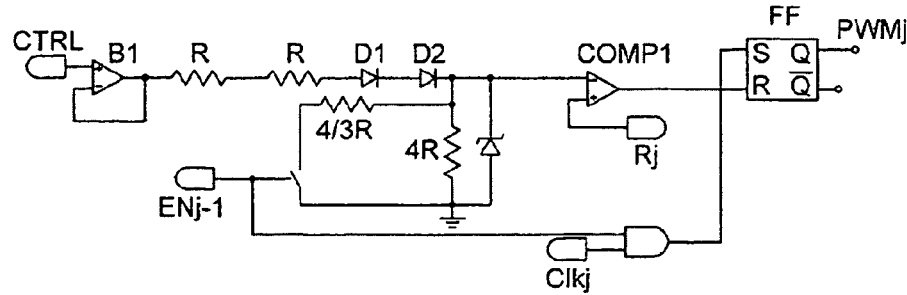
Figure 24:
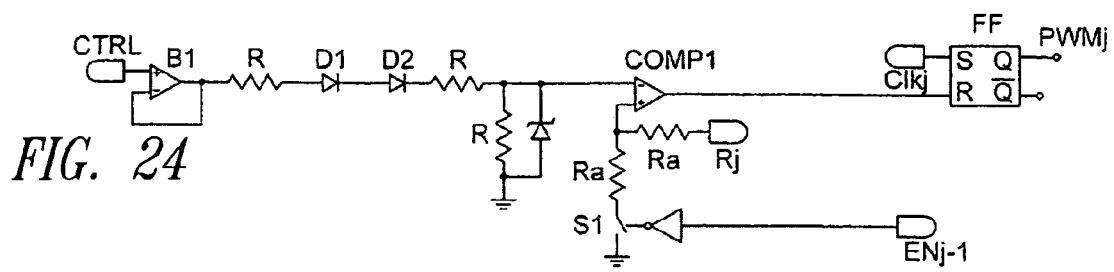
FIGS. 24-26 show possible embodiments of the modulators of the circuit in FIG. 5.
Figure 26:
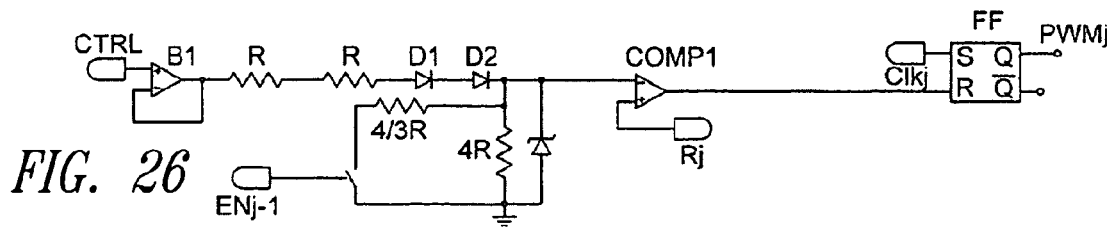

In FIGS. 23 and 26 a resistance having the value 4/3 of R and a switch S1 are placed in parallel to a resistance having the value 4*R placed parallel to the 1V Zener diode. The switch S1 is piloted by the negated signal Enj-1 and the only difference between the circuits of FIGS. 23 and 26 is that the signal S of the flip-flop FF is the signal at the output of a gate AND, which has the signals Enj-1 and Clkj at the input in the circuit in FIG. 23 whilst it is only the signal Clkj in the circuit in FIG. 26.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a plurality of switching converters, the control device comprising:
    a comparator circuit configured to compare a signal representative of a load of the plurality of switching converters with a plurality of reference signals and to enable or disable at least one of said plurality of switching converters in response to the comparison, the comparator circuit including:
        a plurality of comparators with hysteresis, each comparator having a first input terminal configured to receive the signal representative of the load of the plurality of switching converters and a second input terminal configured to receive a reference signal of the plurality of reference signals, each of the comparators configured to disable a corresponding switching converter of the plurality of converters if the representative signal of the load of the plurality of switching converters is less than the corresponding reference signal and to enable the corresponding switching converter if the signal representative of the load of the plurality of switching converters is the same as or greater than a total value given by the corresponding reference signal and the hysteresis; and
    a multivibrator circuit coupled to the plurality of comparators and configured to deactivate each comparator for a period of time after switching.

2. The device of claim 1, further comprising a generating circuit configured to generate a plurality of signals staggered temporally by a given period of time, said plurality of signals received at the plurality of converters.

3. The device of claim 2 wherein the comparator circuit is configured to act on said generating circuit to modify said given period of staggered time as a function of the number of disabled converters.

4. The device of claim 1 wherein the reference signals of the plurality of reference signals have values that differ among one another.

5. The device of claim 1, further comprising a hysteresis control circuit configured to increase or decrease by a given value the hysteresis value of each comparator after switching thereof.

6. The device of claim 1, further comprising a plurality of delay elements coupled to the plurality of comparators and configured to switch-off in sequence the plurality of converters.

7. The device of claim 1, further comprising a generating circuit coupled between the comparator circuit and the plurality of switching converters, and wherein the comparator circuit is configured to communicate with the generating circuit to enable or disable at least one of said plurality of converters.

8. The device of claim 7, further comprising a plurality of turn-off circuits coupled to the plurality of switching converters, each turn-off circuit configured to progressively reduce to zero power carried by the corresponding switching converter in response to the comparator circuit.

9. The device of claim 1, further comprising a generating circuit coupled between the comparator circuit and the plurality of switching converters, and wherein the comparator circuit is configured to communicate with the generating circuit to enable or disable at least one of said plurality of converters.

10. The device of claim 9, further comprising a plurality of turn-off circuits coupled to the plurality of switching converters, each turn-off circuit configured to progressively reduce power to zero that is carried by the corresponding switching converter in response to the comparator circuit.

11. A system, comprising:
    a plurality of switching converters, each switching converter having at least one power switch;
    a plurality of control circuits coupled to respective ones of the plurality of switching converters;
    a control signal generator circuit coupled to the plurality of switching converters and configured to generate to the plurality of control circuits a control signal representative of a load of the plurality of switching converters;
    a control device coupled to the plurality of control circuits and having a comparator circuit configured to compare the control signal with a respective one of a plurality of reference signals and to enable or disable at least one of the plurality of switching converters in response to the comparison, the comparator circuit being coupled to each control circuit of the plurality of control circuits and configured to receive the plurality of reference signals and the control signal and to output an enable/disable signal to each of the plurality of control circuits in response to the comparison of the plurality of reference signals with the control signal; and
    a clock circuit coupled to the control circuits and structured to generate timing signals, and wherein the control device further includes a generating circuit configured to generate an adjustment signal configured to adjust reception of the timing signals by the plurality of control circuits.

12. The system of claim 11 wherein the comparator circuit comprises a plurality of comparators, each comparator configured to receive the control signal and one of the plurality of reference signals.

13. The system of claim 12 wherein the comparators are configured as comparators having hysteresis, each of the comparators adapted to disable a corresponding control circuit when the control signal is less than the corresponding reference signal and to enable to the control circuit when the control signal is the same as or greater than a total value given by the corresponding reference signal and the hysteresis.

14. The system of claim 13 wherein the plurality of reference signals each have values that differ one from another.

15. A control device for a plurality of switching converters, the control device comprising:
- a comparator circuit configured to compare a signal representative of a load of the plurality of switching converters with a plurality of reference signals and to enable or disable at least one of said plurality of switching converters in response to the comparison, the comparator circuit including:
  - a plurality of comparators with hysteresis, each comparator having a first input terminal configured to receive the signal representative of the load of the plurality of switching converters and a second input terminal configured to receive a reference signal of said plurality of reference signals, each of the comparators configured to disable a corresponding switching converter of the plurality of converters if the representative signal of the load of the plurality of switching converters is less than the corresponding reference signal and to enable the corresponding switching converter if the signal representative of the load of the plurality of switching converters is the same as or greater than a total value given by the corresponding reference signal and the hysteresis; and
  - a hysteresis circuit coupled to the comparator circuit and configured to increase or decrease by a given value the hysteresis value of each comparator after switching thereof.

16. The device of claim 15, wherein the hysteresis circuit includes a multivibrator circuit configured to deactivate each comparator for a preset period of time after switching thereof.

17. The device of claim 15, further comprising a plurality of delay elements coupled to the plurality of comparators and configured to switch-off in sequence the plurality of converters.

18. A control device for a plurality of switching converters, the control device comprising:
- a comparator circuit configured to compare a signal representative of a load of the plurality of switching converters with a plurality of reference signals and to enable or disable at least one of the plurality of switching converters in response to the comparison, the comparator circuit including:
  - a plurality of comparators with hysteresis, each comparator having a first input terminal configured to receive the signal representative of the load of the plurality of switching converters and a second input terminal configured to receive a reference signal of said plurality of reference signals, each of the comparators configured to disable a corresponding switching converter of the plurality of converters if the representative signal of the load of the plurality of switching converters is less than the corresponding reference signal and to enable the corresponding switching converter if the signal representative of the load of the plurality of switching converters is the same as or greater than a total value given by the corresponding reference signal and the hysteresis; and
  - a plurality of delay elements coupled to the plurality of comparators and configured to switch-off in sequence the plurality of converters.

19. The device of claim 18, further comprising a multivibrator circuit coupled to each comparator and configured to deactivate each comparator for a preset period of time after switching thereof.

20. The device of claim 18, further comprising a hysteresis circuit configured to increase or decrease by a given value the hysteresis value of each comparator after switching thereof.

21. The device of claim 18, further comprising a generating circuit coupled between the comparator circuit and the plurality of switching converters, and wherein the comparator circuit is configured to communicate with the generating circuit to enable or disable at least one of said plurality of switching converters.

22. The device of claim 21, further comprising a plurality of turn-off circuits coupled to the plurality of switching converters, each turn-off circuit configured to progressively reduce to zero power carried by the corresponding switching converter in response to the comparator circuit.

* * * * *